(12) United States Patent
Shen-Orr et al.

(10) Patent No.: US 8,041,943 B2
(45) Date of Patent: Oct. 18, 2011

(54) REVOCATION LIST IMPROVEMENT

(75) Inventors: Chaim Shen-Orr, Haifa (IL); Yaacov (Jordan) Levy, Maaleh Adumim (IL); Yaacov Belenky, Maaleh Adumim (IL)

(73) Assignee: NDS Limited, Staines, Middlesex (GB)

( * ) Notice: Subject to any disclaimer, the term of this patent is extended or adjusted under 35 U.S.C. 154(b) by 528 days.

(21) Appl. No.: 12/223,642

(22) PCT Filed: Oct. 3, 2006

(86) PCT No.: PCT/IL2006/001151
§ 371 (c)(1),
(2), (4) Date: Sep. 10, 2008

(87) PCT Pub. No.: WO2007/110852
PCT Pub. Date: Oct. 4, 2007

(65) Prior Publication Data
US 2009/0113206 A1    Apr. 30, 2009

(30) Foreign Application Priority Data
Mar. 29, 2006   (IL) .......................................... 174614

(51) Int. Cl.
*H04L 9/00* (2006.01)
(52) U.S. Cl. ........................................ 713/158; 380/286
(58) Field of Classification Search .................. 713/158, 713/157
See application file for complete search history.

(56) References Cited

U.S. PATENT DOCUMENTS

| 5,461,675 | A | 10/1995 | Diehl et al. | |
| 5,949,877 | A | 9/1999 | Traw et al. | |
| 6,314,517 | B1 * | 11/2001 | Moses et al. | 713/156 |
| 7,117,360 | B1 * | 10/2006 | Zhao | 713/158 |
| 7,382,762 | B2 * | 6/2008 | Chmora et al. | 370/342 |
| 2003/0014629 | A1 | 1/2003 | Zuccherato | |
| 2003/0061481 | A1 | 3/2003 | Levine et al. | |
| 2004/0168056 | A1 * | 8/2004 | Dillaway et al. | 713/156 |

(Continued)

FOREIGN PATENT DOCUMENTS

EP    1 594 251 A1    11/2005

(Continued)

OTHER PUBLICATIONS

Jan. 18, 2011 Office Communication in connection with prosecution of EP 06 796 144.1.

(Continued)

*Primary Examiner* — Matthew Smithers
(74) *Attorney, Agent, or Firm* — Husch Blackwell LLP

(57) ABSTRACT

A method for enforcing use of certificate revocation lists in validating certificates, the lists being associated with a series of list generation indices such that each list is assigned one index which advances according to a time of generation of the list, the lists and the indices being cryptographically signed, the method including receiving one of the lists and an associated index as an identifier of the one list, checking the certificates against the list, associating each of the certificates, which have been checked against the list, with the index, receiving an enforcement generation index (EGI) associated with a latest list in use, storing the EGI as a last known EGI, and refusing performance of an action associated with a certificate if the one index of the one certificate is earlier in the series than the last known EGI. Related apparatus and methods are also included.

16 Claims, 10 Drawing Sheets

U.S. PATENT DOCUMENTS

| | | | |
|---|---|---|---|
| 2005/0154875 A1 | 7/2005 | Chao | |
| 2005/0154898 A1 | 7/2005 | Chao | |
| 2005/0154918 A1* | 7/2005 | Engberg | 713/201 |
| 2005/0198508 A1 | 9/2005 | Beck | |
| 2005/0204127 A1 | 9/2005 | Dive-Reclus et al. | |
| 2005/0257045 A1 | 11/2005 | Bushman et al. | |
| 2005/0257046 A1* | 11/2005 | Durand | 713/158 |
| 2008/0163338 A1* | 7/2008 | Micali | 726/2 |

FOREIGN PATENT DOCUMENTS

| | | |
|---|---|---|
| EP | 1 732 261 A1 | 12/2006 |
| WO | WO 01/61591 A1 | 8/2001 |
| WO | WO 03/056823 A1 | 7/2003 |
| WO | WO 2005/093992 A1 | 10/2005 |
| WO | WO 2006/043262 A2 | 4/2006 |

OTHER PUBLICATIONS

Mar. 22, 2010 Office Communication in connection with prosecution of EP 06 79 6144.1.

*Series X: Data Networks and Open System Communications Directory; Information technology-Open Systems Interconnection—The Directory; Authentication Framework*, pp. 22-43 (ITU-T Recommendation X.509; International Telecommunication Union, Aug. 1997).

James M. Hayes, "Restricting Access with Certificate Attributes in Multiple Root Envioronments—A Recipe for Certificate Masquerading" (Systems and Network Attack Center, National Security Agency).

Aug. 25, 2010 Office Communication in connection with prosecution of AU 2006 341099.

Apr. 21, 2011 Office Communication in connection with prosecution of AU 2006 341099.

* cited by examiner

FIG. 2
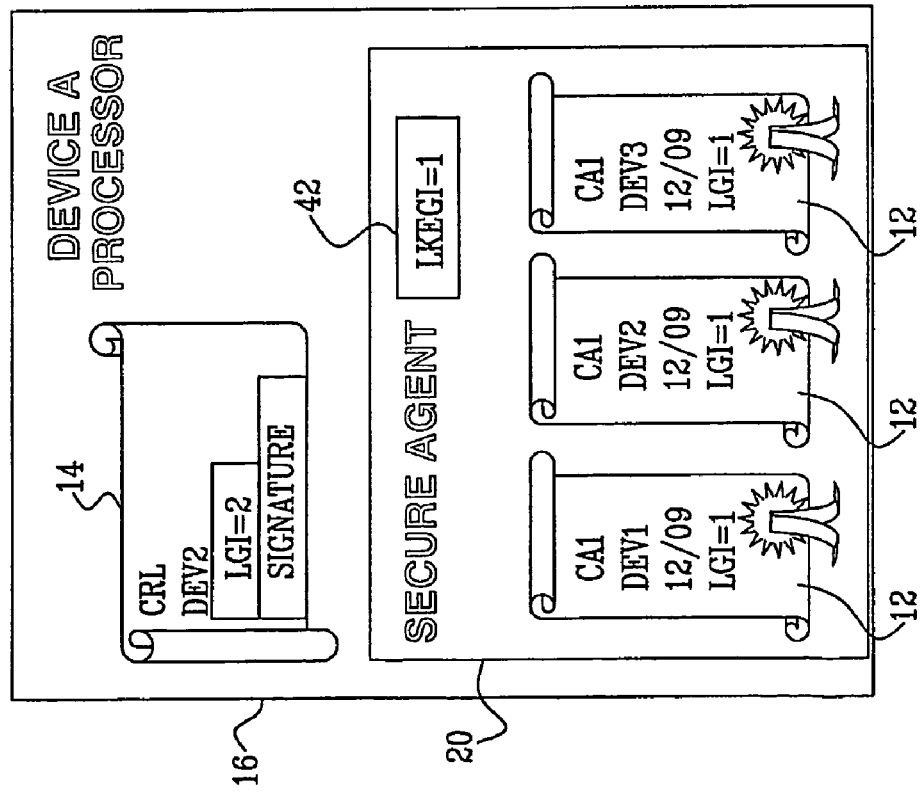
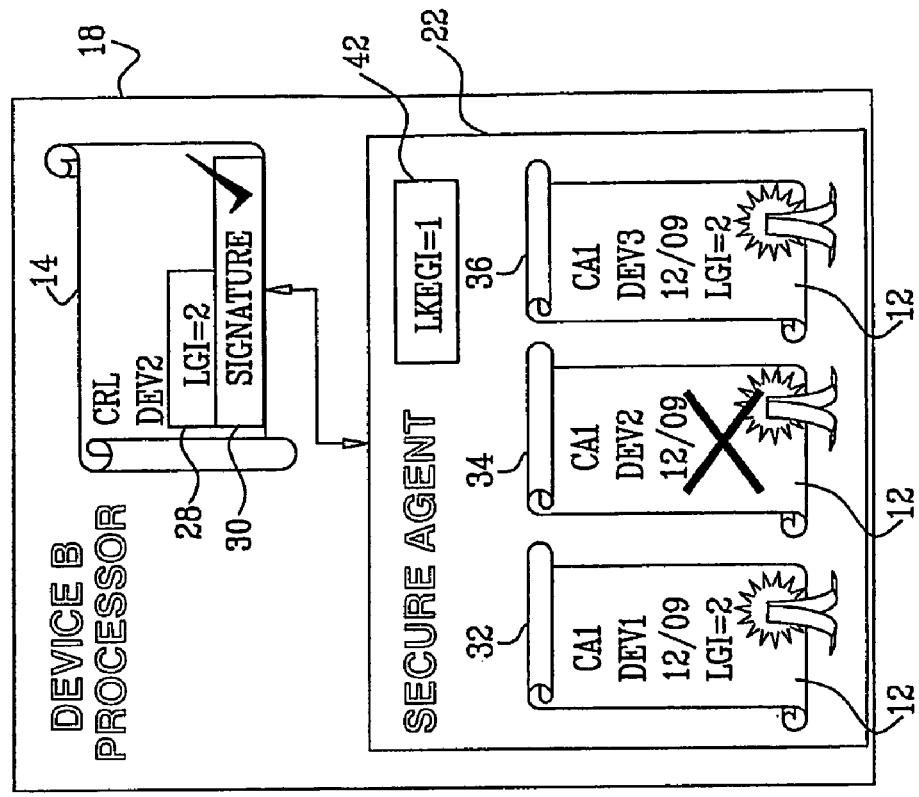

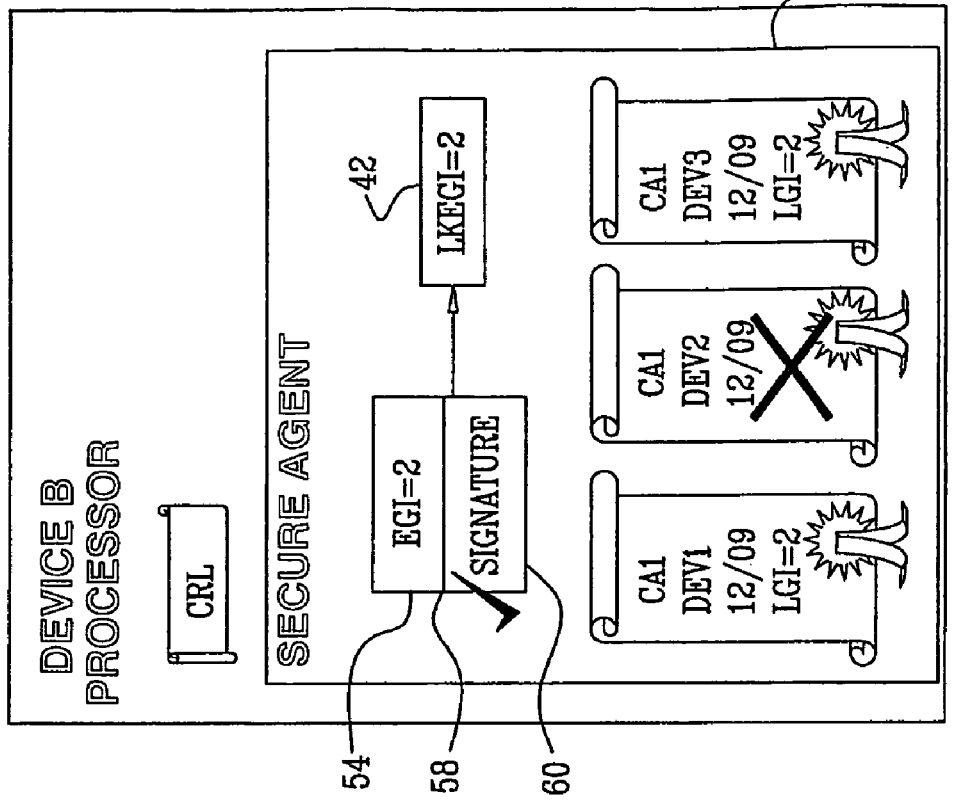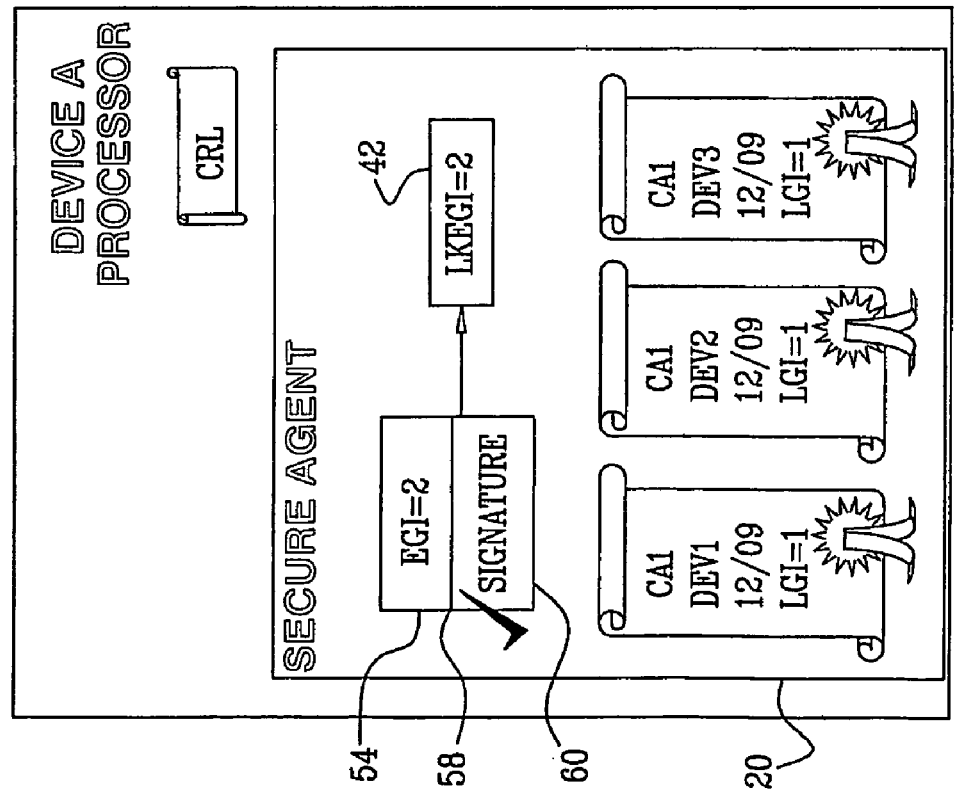
FIG. 6

REVOCATION LIST IMPROVEMENT

The present application is a 35 USC §371 application of PCT/IL2006/001151, filed on 3 Oct. 2006 and entitled "Revocation List Improvement", which was published on 4 Oct. 2007 in the English language with International Publication Number WO 2007/110852 and which relies for priority on Israel Patent Application No. 174614, filed on 29 Mar. 2006.

FIELD OF THE INVENTION

The present invention relates to certificate revocation lists, and in particular, to a system and method for ensuring use of certificate revocation lists.

BACKGROUND OF THE INVENTION

By way of introduction, a certificate authority generally prepares a certificate revocation list of certificates which have been revoked by the certificate authority. The list is typically updated periodically. The list is generally used by authenticating devices to ensure that a seemingly valid certificate has not been revoked by the certificate authority which issued the certificate.

The use of certificate revocation lists is generally not enforced and it is up to the authenticating device to ensure that the device has the most up-to-date certificate revocation list(s) as well as to ensure that certificate authentication is performed against the certificate revocation list(s).

The following reference is believed to represent the state of the art:

PCT Application No. IL2005/000957 of NDS Limited;
US Published Patent Application 2004/0168056 of Dillaway, et al.;
US Published Patent Application 2005/0204127 of Dive-Reclus, et al.;
US Published Patent Application 2005/0257045 of Bushman, et al.;
US Published Patent Application 2005/0198508 of Beck;
US Published Patent Application 2005/0154898 of Chao;
US Published Patent Application 2005/0154875 of Chao;
US Published Patent Application 2003/0061481 of Levine, et al.; and
An article entitled "Restricting Access with Certificate Attributes in Multiple Root Environments—A Recipe for Certificate Masquerading" by Capt James M. Hayes of USAF, Systems and Network Attack Center, National Security Agency, Suite 6704—9800 Savage Road, Fort George G. Meade, Maryland 20755-6704, USA.

The disclosures of all references, mentioned above and throughout the present specification, as well as the disclosures of all references mentioned in those references, are hereby incorporated herein by reference.

SUMMARY OF THE INVENTION

The present invention seeks to provide a system and method for ensuring use of certificate revocation lists.

By way of introduction, a system contemplated by the inventors of the present invention preferably includes providing a secure agent for enforcing certificate revocation policy. The secure agent is typically implemented inside a non-secure processor running non-trusted software. The secure agent typically establishes a secure connection with a certificate authority in order to receive a latest certificate revocation list (CRL). The CRL is then completely stored in the secure agent which checks a certificate against the CRL when an action associated with the certificate is requested. However, when the secure agent is implemented in hardware (typically for security reasons), the logic of securely checking a certificate against the CRL is generally too complicated due to the processing and storage capabilities of the secure agent.

Therefore, in accordance with a most preferred embodiment of the present invention, the non-trusted software of the non-secure processor is typically responsible for supplying the necessary data of the CRL and associated commands to the secure agent so that the secure agent typically does not need to store and/or process the whole CRL at the same time.

The most preferred embodiment of the present invention includes controls that are established to ensure that a requested action is refused by the secure agent if the certificate associated with the requested action has not been checked against a latest and valid CRL.

The controls preferably include distributing a CRL with an associated list generation index (LGI) as an identifier of the CRL. The CRL and LGI are typically signed together with a signature. The signature of the CRL and LGI is generally checked by the secure agent to ensure that the CRL and/or LGI have not been tampered with.

The receipt of the new CRL by the secure agent preferably prompts the non-secure software to request the secure agent to check certificates held by the secure agent against the CRL. The validity status of the certificates as well as the LGI of the CRL used to check the certificates in typically associated with the certificates. In accordance with an alternative preferred embodiment of the present invention the validity status of the certificates as well as the LGI of the CRL used to check the certificates in typically logged in the certificates themselves.

At this stage, use of the new CRL is not necessarily enforced.

Then, the certificate authority typically sends a message to the secure agent including an enforcement GI (EGI) having the same value as the LGI of the latest CRL in circulation. The message is preferably signed and typically sent in a secure channel. However, it will be appreciated by those ordinarily skilled in the art that the EGI can be sent without a signature and/or without a secure channel, depending on the desired security level of the implementation.

The received EGI is generally stored in the secure device as the last known EGI (LKEGI).

When an action associated with a certificate is requested, the secure device preferably compares the LKEGI with the LGI of the certificate. If the LGI of the certificate is earlier in the series of generation indices than the LKEGI, then the action is typically refused by the secure agent.

Therefore, if the current CRL is not used by the secure agent to check certificates, for example, but not limited to, the secure agent not receiving the current CRL or the current CRL being tampered with, then an action associated with one or more of the certificates is typically refused.

Therefore, it will be appreciated that non-trusted software cannot typically tamper with the CRL, nor prevent delivery of a CRL, in order to allow invalid certificates to be validated by the secure agent after the current EGI is received by the secure agent.

The present invention, in preferred embodiments thereof, also includes a system for revoking a root certificate of a root certificate authority by another entity, preferably another root certificate authority.

There is thus provided in accordance with a preferred embodiment of the present invention, a method for enforcing use of certificate revocation lists in validating certificates, the certificate revocation lists being associated with a series of list generation indices such that each of the certificate revocations lists is assigned one of the list generation indices, the list generation indices advancing a time of generation of the certificate revocation lists, the certificate revocation lists and the list generation indices being cryptographically signed; the method including receiving one of the certificate revocation lists and an associated one of the list generation indices as an identifier of the one certificate revocation list, checking the certificates against the one certificate revocation list, associating each of the certificates, which have been checked against the one certificate revocation list, with the one list generation index, receiving an enforcement generation index associated with a latest one of the certificate revocation lists in use, storing the enforcement generation index as a last known enforcement generation index, and refusing performance of an action associated with one of the certificates if the one list generation index of the one certificate is earlier in the series than the last known enforcement generation index.

Further in accordance with a preferred embodiment of the present invention, the method includes storing the checked certificates such that each of the checked certificates includes the one list generation index.

Still further in accordance with a preferred embodiment of the present invention, the method includes checking an authenticity of the one certificate revocation list and the one list generation index.

Additionally in accordance with a preferred embodiment of the present invention, the method includes checking an authenticity of the enforcement generation index.

Moreover in accordance with a preferred embodiment of the present invention, the method includes establishing a secure authenticated channel to receive the enforcement generation index.

Further in accordance with a preferred embodiment of the present invention, the method includes revoking the one certificate if the one list generation index of the one certificate is earlier in the series than the last known enforcement generation index.

Still further in accordance with a preferred embodiment of the present invention, the method includes allowing performance of another action even if the one list generation index of the one certificate is earlier in the series than the last known enforcement generation index.

There is also provided in accordance with still another preferred embodiment of the present invention a method for revoking root certificates including providing a plurality of root certificate authorities, each of the root certificate authorities having an associated root certificate, and issuing revocation data for revoking the root certificate of one of the root certificate authorities.

Additionally in accordance with a preferred embodiment of the present invention, the method includes cryptographically signing the revocation data.

Moreover in accordance with a preferred embodiment of the present invention the signing is performed by one of the root certificate authorities.

Further in accordance with a preferred embodiment of the present invention the signing is performed by at least two of the root certificate authorities.

There is also provided in accordance with still another preferred embodiment of the present invention a system for enforcing use of certificate revocation lists in validating certificates, the certificate revocation lists being associated with a series of list generation indices such that each of the certificate revocations lists is assigned one of the list generation indices, the list generation indices advancing a time of generation of the certificate revocation lists, the certificate revocation lists and the list generation indices being cryptographically signed, the system including a list receiving module to receive one of the certificate revocation lists and an associated one of the list generation indices as an identifier of the one certificate revocation list, a list validation module to check the certificates against the one certificate revocation list, and associate each of the certificates, which have been checked against the one certificate revocation list, with the one list generation index, an enforcement generation index module to receive an enforcement generation index associated with a latest one of the certificate revocation lists in use, and store the enforcement generation index as a last known enforcement generation index, and a certificate validation enforcement module to refuse performance of an action associated with one of the certificates if the one list generation index of the one certificate is earlier in the series than the last known enforcement generation index.

Still further in accordance with a preferred embodiment of the present invention, the system includes a certificate storage module to store the checked certificates such that each of the checked certificates includes the one list generation index.

Additionally in accordance with a preferred embodiment of the present invention the list receiving module includes an authenticity checker to check an authenticity of the one certificate revocation list and the one list generation index.

Moreover in accordance with a preferred embodiment of the present invention the enforcement generation index module includes an authenticity checker to check an authenticity of the enforcement generation index.

Further in accordance with a preferred embodiment of the present invention the enforcement generation index module includes a secure channel setup module to at least partially establish a secure authenticated channel to receive the enforcement generation index.

Still further in accordance with a preferred embodiment of the present invention the certificate validation enforcement module is operative to revoke the one certificate if the one list generation index of the one certificate is earlier in the series than the last known enforcement generation index.

Additionally in accordance with a preferred embodiment of the present invention the certificate validation module is operative to allow performance of another action even if the one list generation index of the one certificate is earlier in the series than the last known enforcement generation index.

There is also provided in accordance with still another preferred embodiment of the present invention a system for enforcing use of certificate revocation lists in validating certificates, the system including a list receiving module to receive a certificate revocation list and an associated list generation index as an identifier of the certificate revocation list, the certificate revocation list and the list generation index being cryptographically signed, a list validation module to check the certificates against the certificate revocation list, and associate each of the certificates, which have been checked against the certificate revocation list, with the list generation index, an enforcement generation index module to receive an enforcement generation index associated with a latest certificate revocation list in use, and store the enforcement generation index as a last known enforcement generation index, and a certificate validation enforcement module to refuse performance of an action associated with one of the certificates if the list generation index of the one certificate is earlier a series generation indices than the last known enforcement generation index.

There is also provided in accordance with still another preferred embodiment of the present invention a system for revoking root certificates including a plurality of root certificate authorities, each of the root certificate authorities having an associated root certificate, a root certificate revocation module to issue revocation data for revoking the root certificate of one of the root certificate authorities.

Moreover in accordance with a preferred embodiment of the present invention the root certificate revocation module is included in one of the root certificate authorities.

Further in accordance with a preferred embodiment of the present invention, the system includes a signer module to cryptographically sign the revocation data.

Still further in accordance with a preferred embodiment of the present invention the signer module is included in one of the root certificate authorities.

Additionally in accordance with a preferred embodiment of the present invention the revocation data is cryptographically signed by at least two of the root certificate authorities.

Moreover in accordance with a preferred embodiment of the present invention the revocation data is included in a revocation list.

BRIEF DESCRIPTION OF THE DRAWINGS

The present invention will be understood and appreciated more fully from the following detailed description, taken in conjunction with the drawings in which:

FIG. 2 is a partly pictorial, partly block diagram view of a secure agent of the system of FIG. 1 processing receipt of a certificate revocation list;

FIG. 6 is a partly pictorial, partly block diagram view of the secure agents of the system of FIG. 1 processing receipt of the enforcement generation index of FIG. 5;

DETAILED DESCRIPTION OF A PREFERRED EMBODIMENT

Figure 1:
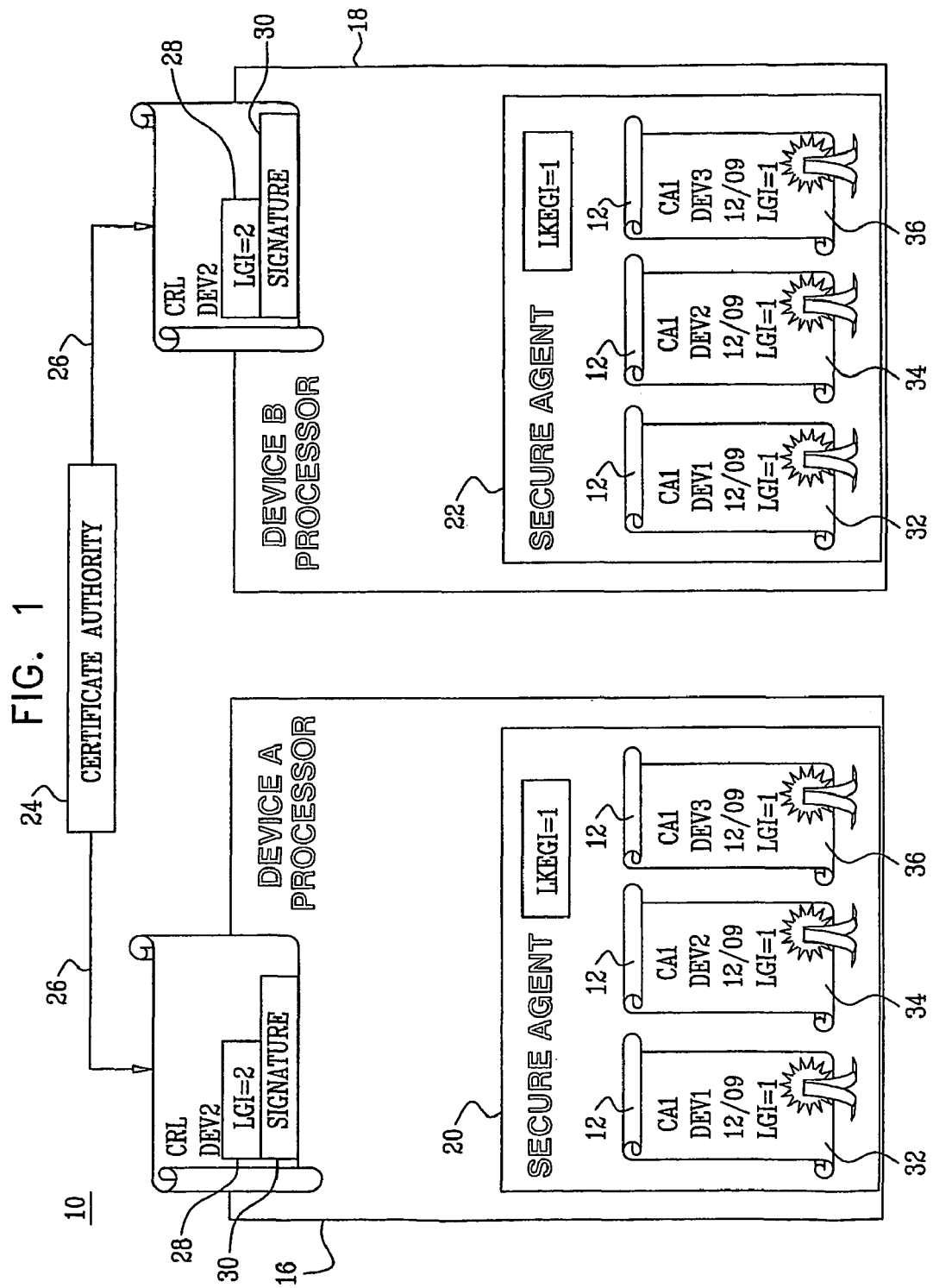
FIG. 1 is a partly pictorial, partly block diagram view of a certificate revocation list enforcement system constructed and operative in accordance with a preferred embodiment of the present invention.

Reference is now made to FIG. 1, which is a partly pictorial, partly block diagram view of a certificate revocation list enforcement system 10 constructed and operative in accordance with a preferred embodiment of the present invention.

By way of introduction, the system 10 preferably includes a certificate authority 24 for issuing a plurality of certificates 12 as well as a plurality of certificate revocation lists 14 associated with revoked ones of the certificates 12.

The system 10 typically includes a non-secure processor 16 of a device A and a non-secure processor 18 of a device B. The processor 16 and the non-secure processor 18 typically run non-trusted software. The processor 16 generally includes a secure agent 20. The processor 18 generally includes a secure agent 22. The secure agent 20 and the secure agent 22 each preferably store signed copies of the certificates 12.

In an SVP system, each of the secure agents 20, 22 is typically a logic block within a larger SVP chip. In accordance with a most preferred embodiment of the present invention, each of the secure agents 20, 22 is implemented as part of a Secure Video Processor (SVP) typically included in a set-top box (also known as an integrated receiver-decoder). The SVP processor is preferably implemented in hardware for security reasons. The secure agent 20 and the secure agent 22 typically enforce certificate revocation policy, described in more detail below.

The certificate revocation lists 14 are preferably uniquely associated with a series of list generation indices 28 such that each of the certificate revocations lists 14 is assigned one of the list generation indices 28. The list generation indices 28 typically advance according to a time of generation of the certificate revocation lists 14 so that later certificate revocation lists 14 typically have a higher list generation index 28. However, it will be appreciated by those ordinarily skilled in the art that the list generation indices 28 can be assigned in a descending order such that later certificate revocation lists 14 will have a lower list generation index 28, or in any other suitable standard or non-standard order. It will also be appreciated by those ordinarily skilled in the art that the series of the list generation indices 28 can skip certain values.

The certificate revocation lists 14 and the list generation indices 28 are preferably cryptographically signed by the certificate authority 24. The certificate authority 24 preferably forms the certificate revocation lists 14 such that each certificate revocation list 14 includes the associated list generation index 28. The combined certificate revocation list 14 and the list generation index 28 are typically signed by a single digital signature 30.

The signature 30 is typically a cryptographic digital signature known to those ordinarily skilled in the art, for example, but not limited to, using RSA or DSA signature algorithm.

Each of the certificates 12 preferably includes: a field identifying an issuer of the certificate (the certificate authority 24 (CA1) in the example of FIG. 1); the entity for which the certificate 12 was issued (a device 1 (DEV1), or device 2 (DEV2), or a device 3 (DEV3), in the example of FIG. 1); the expiry date of the certificate 12 (12/09 in the example of FIG. 1); and the list generation index 28 of the certificate revocation list 14 last used to check the certificate 12 against the certificate revocation list 14.

In order to simplify the description of the system 10 with reference to FIGS. 1-7, the certificates 12 of the device 1 (DEV1), the device 2 (DEV2) and the device 3 (DEV3) are defined as a certificate 32, a certificate 34, and a certificate 36, respectively.

FIG. 1 shows a single new certificate revocation list 14 being distributed by the certificate authority 24. The list generation index 28 of the new certificate revocation list 14 is equal to 2.

In the example of FIG. 1, before the secure agent 20 and secure agent 22 receive the new certificate revocation list 14, the certificates 12 resident in the secure agent 20 and the secure agent 22 were checked by the secure agent 20 and the secure agent 22, respectively, against a prior certificate revocation list having a list generation index equal to 1 (not shown). Therefore, before the new certificate revocation list 14 is received, the list generation index 28 of the certificates 12 stored in the secure agents 20, 22 is equal to 1.

The new certificate revocation list 14 is typically received by the processor 16 and the processor 18 via a non-secure channel 26. The new certificate revocation list 14 is preferably either "pushed" to, or "pulled" by, the devices A and B of the processor 16 and the processor 18, respectively.

In a broadcasting environment, the same certificate revocation list 14 is typically rebroadcast periodically in order to ensure that devices that are occasionally turned off eventually receive the new certificate revocation list 14.

Reference is now made to FIG. 2, which is a partly pictorial, partly block diagram view of a secure agent of the system 10 of FIG. 1 processing receipt of the new certificate revocation list 14.

The non-trusted software of the processors 16, 18 is typically responsible for supplying the necessary data of the new certificate revocation list 14 and associated commands to the secure agents 20, 22 so that the secure agents 20, 22, respectively, do not need to store and/or process the whole certificate revocation list 14 at the same time.

Controls are preferably established to ensure that a requested action is refused by the secure agents 20, 22 if the certificate 12 associated with the requested action has not been checked against a latest and valid certificate revocation list 14 (typically after the new certificate revocation list 14 has been in circulation for a given period of time), as will be described below in more detail.

The secure agents 20, 22 each typically store a value of the last known enforcement generation index (LKEGI) 42. The LKEGI 42 is generally an important part of the controls. The function of the LKEGI 42 is described in more detail with reference to FIGS. 3-7. The current value of the LKEGI 42 is equal to 1 for each of the secure agents 20, 22.

The example of FIG. 2 assumes that the software running on the processor 16 either prevents the secure agent 20 from receiving the new certificate revocation list 14 or that the software running on the processor 16 tampers with the new certificate revocation list 14 so that the secure agent 20 rejects the new certificate revocation list 14.

On the other hand, the software running on the processor 18 supplies the secure agent 22 with the necessary data of the new certificate revocation list 14 and associated commands. The secure agent 22 receives the new certificate revocation list 14 and the associated list generation index 28. The term "receives the new certificate revocation list" as used in the specification and claims is defined to include receiving the necessary data of the certificate revocation list 14.

The secure agent 22 preferably checks the authenticity of the new certificate revocation list 14 and the list generation index 28 typically by checking the signature 30. If the authenticity check of the signature 30 fails, the certificate revocation list 14 is preferably rejected by the secure agent 22.

The receipt of the new certificate revocation list 14 by the software running on the processor 16 preferably prompts the software running on the processor 16 to request the secure agent 22 to check the certificates 12 stored by the secure agent 22 against the new certificate revocation list 14. The validity status of the certificates 12 is typically included in the certificates. Additionally, the list generation index 28 of the certificate revocation list 14 used to check the certificates 12 is generally included in the valid certificates 12 thereby associating the checked valid certificates 12 with the list generation index 28 of the certificate revocation list 14 used to check the certificates 12. In the example of FIG. 2, the certificates 12 of the secure agent 20 are unchanged (compared to FIG. 1) as the secure agent 20 did not receive a valid certificate revocation list 14.

The certificates 32, 34, 36 of the secure agent 22 are preferably checked against the new certificate revocation list 14. The certificate 32 and the certificate 36 are still valid after the check against the new certificate revocation list 14 and therefore, the list generation index 28 of the certificate 32 and the certificate 36 are preferably updated from 1 to 2, as shown in FIG. 2. The certificate 34 associated with DEV2 is invalidated after checking the certificate 34 with the new certificate revocation list 14 which includes the certificate 34 as being revoked.

At this stage, use of the new certificate revocation list 14 is preferably not enforced. Nevertheless, if the secure agent 22 invalidates one of the certificates 12 by checking the certificate 12 against the new certificate revocation list 14, then an action requiring certificate validation will preferably be refused by the secure agent 22, even though use of the certificate revocation list 14 is not enforced at this stage.

Figure 3:
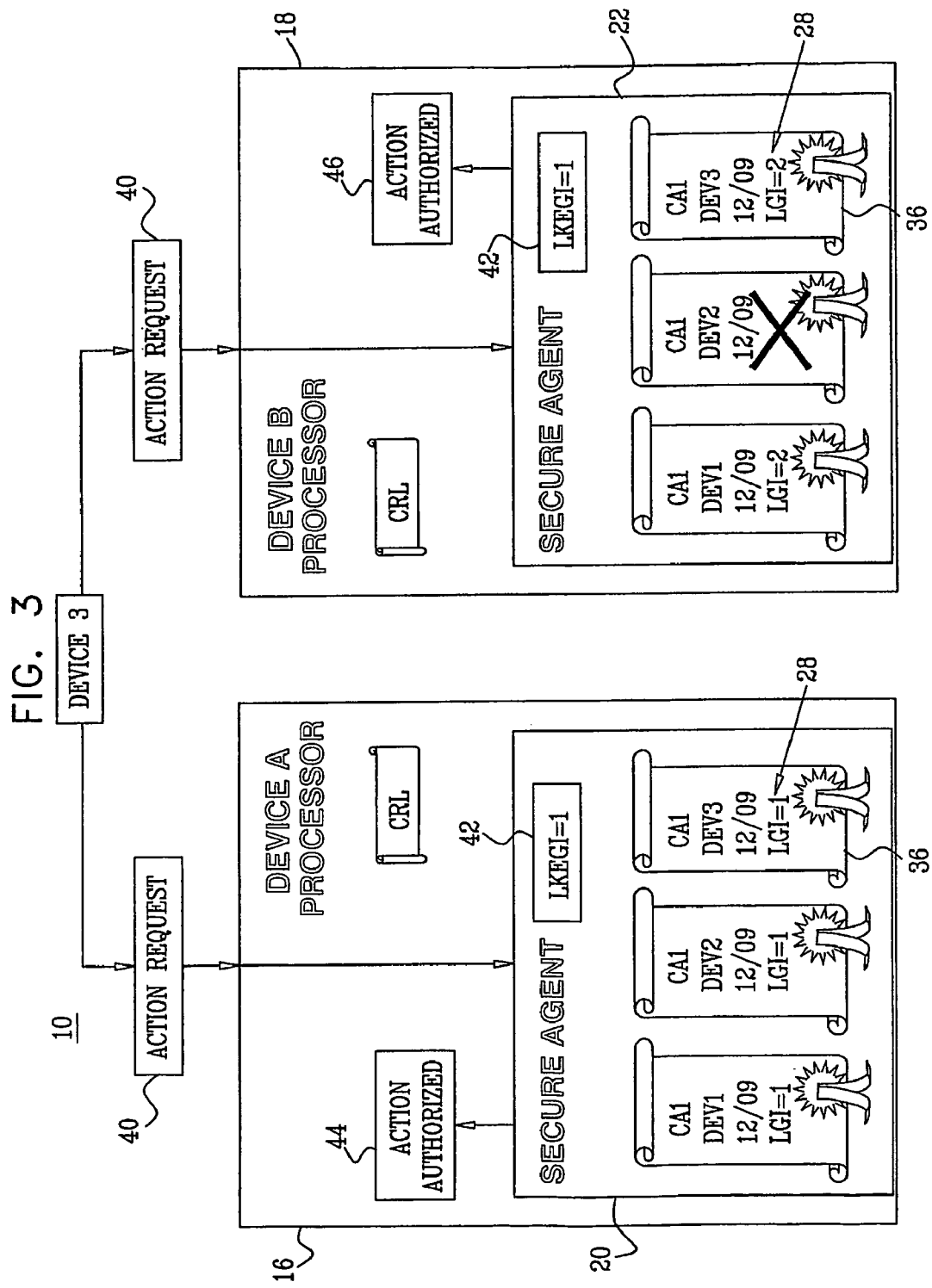
FIG. 3 is a partly pictorial, partly block diagram view of the secure agents of the system of FIG. 1 processing an action request from a device.

Reference is now made to FIG. 3, which is a partly pictorial, partly block diagram view of the secure agents 20, 22 of the system 10 of FIG. 1 processing an action request 40 from the device 3.

The action request 40 is preferably sent from the device 3 to the secure agents 20, 22 via the processors 16, 18, respectively.

As the certificate 36 of the device 3, held by the secure agent 20, is valid and the list generation index 28 of the certificate 36 is not earlier in the series of list generation indices than the value of the LKEGI 42, the action request 40 is typically authorized by the secure agent 20 (block 44).

Similarly, the action request 40 is typically authorized by the secure agent 22 (block 46).

Figure 4:
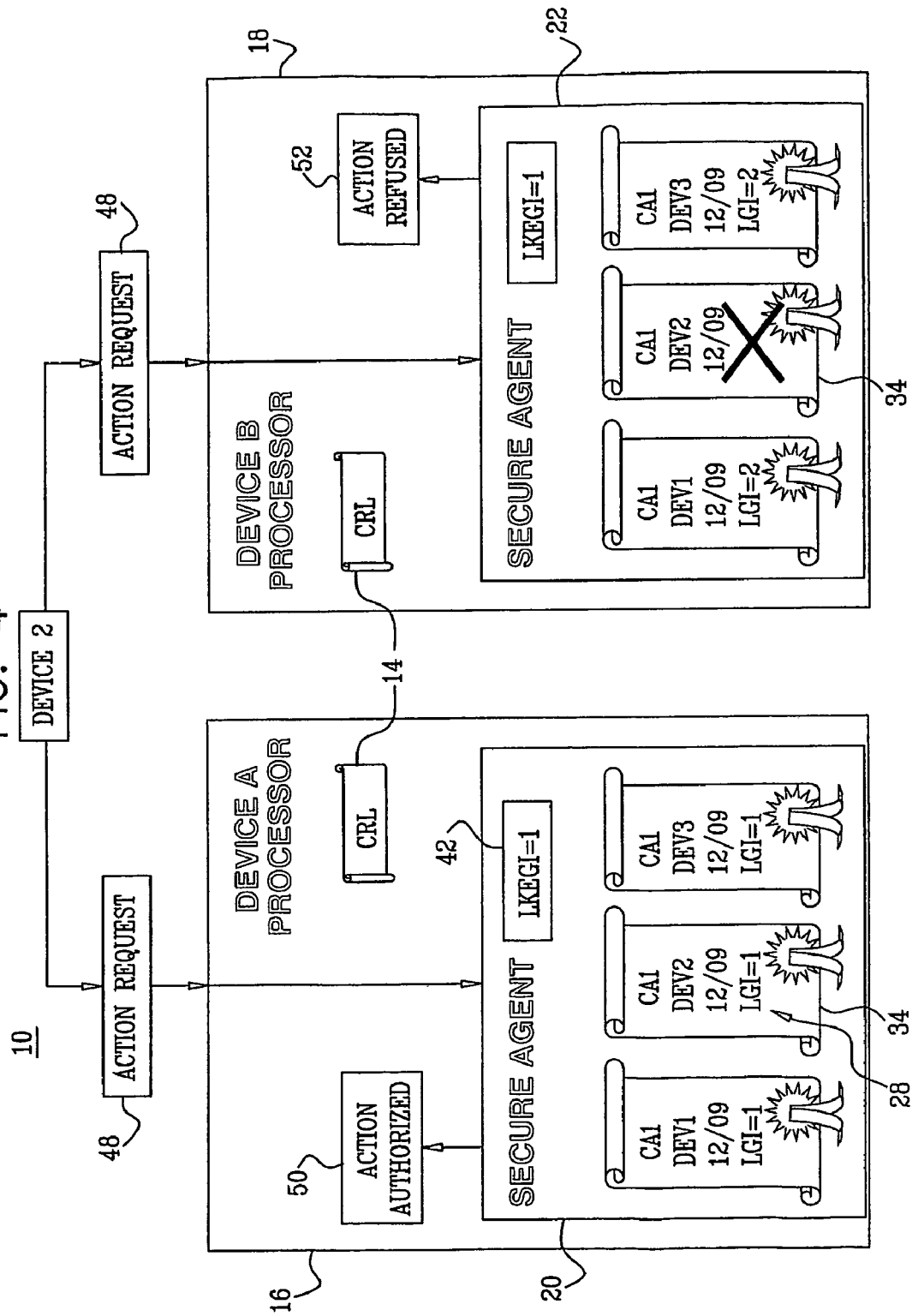
FIG. 4 is a partly pictorial, partly block diagram view of the secure agents of the system of FIG. 1 processing an action request from another device.

Reference is now made to FIG. 4, which is a partly pictorial, partly block diagram view of the secure agents 20, 22 of the system 10 of FIG. 1 processing an action request 48 from the device 2.

The action request 48 is preferably sent from the device 2 to the secure agents 20, 22 via the processors 16, 18, respectively.

As the certificate 34 of the device 2, held by the secure agent 20, is valid (as the certificate 34 of the secure agent 20 was not checked against the new certificate revocation list 14) and the list generation index 28 of the certificate 34 is not earlier in the series of list generation indices than the value of the LKEGI 42, the action request 48 is preferably authorized by the secure agent 20 (block 50).

As the certificate 34 of the device 2, held by the secure agent 22, is invalid (after checking the certificate 34 of the secure agent 20 against the new certificate revocation list 14), the action request 48 is preferably refused by the secure agent 22 (block 52).

Figure 5:
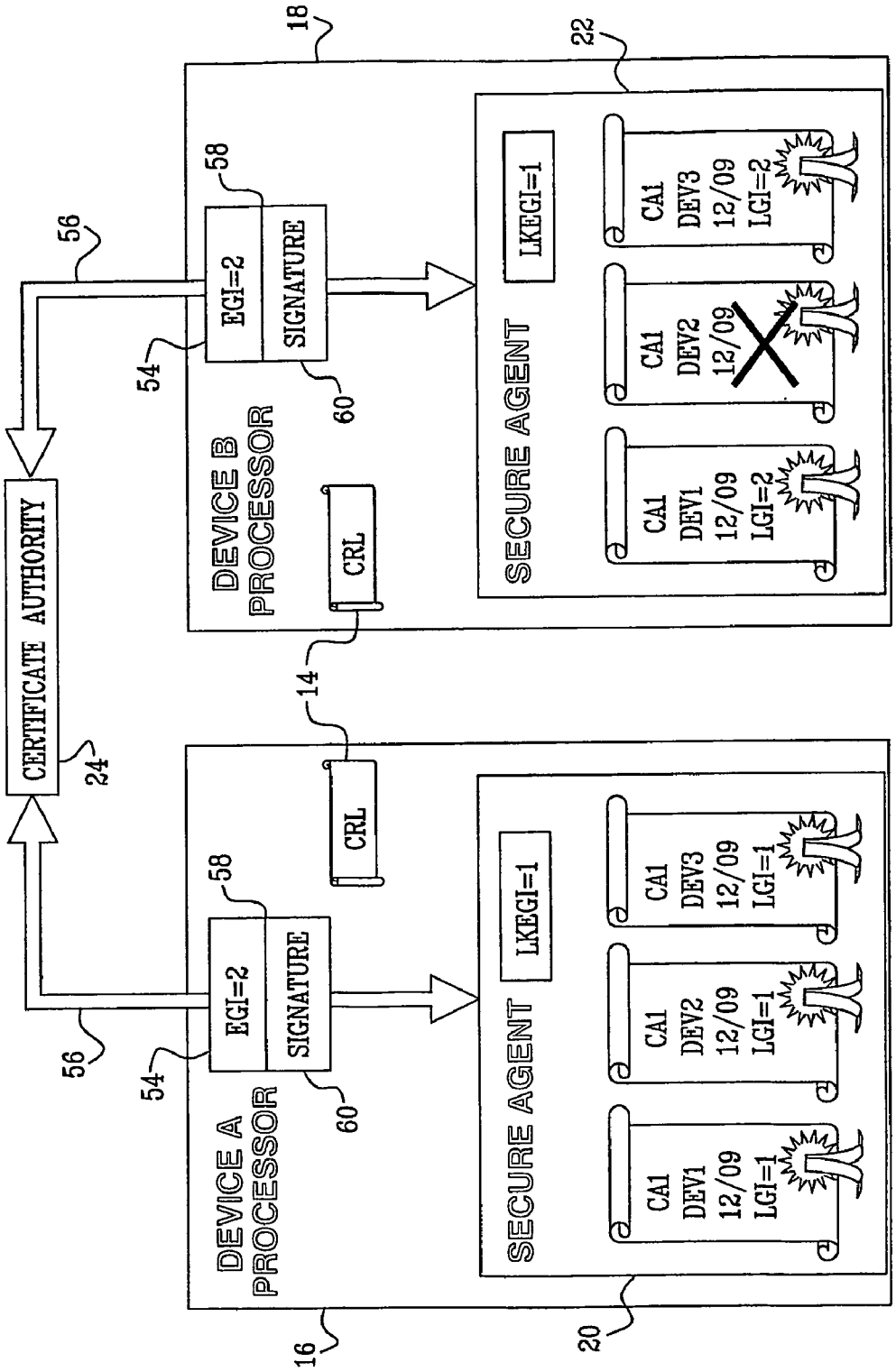
FIG. 5 is a partly pictorial, partly block diagram view of the secure agents of the system of FIG. 1 receiving an enforcement generation index.

Reference is now made to FIG. 5, which is a partly pictorial, partly block diagram view of the secure agents 20, 22 of the system 10 of FIG. 1 receiving an enforcement generation index 54.

A secure authenticated channel 56 is preferably established between the certificate authority 24 and each of the secure agents 20, 22. The term "secure authenticated channel" as used in the specification and claims is defined as a channel of communication between two parties (for example, but not limited to, two devices), the channel being secured using cryptographic protocols and to an extent desired, against modification and exposure of the communication and against impersonation of either of the parties. The certificate authority 24 typically creates a message 58 including the enforcement generation index 54. The enforcement generation index 54 is generally associated with the latest certificate revocation list 14 in use. The certificate authority 24 preferably signs the message 58 with a digital signature 60. The digital signature 60 is typically a digital signature of the enforcement generation index 54.

The message 58 is preferably sent from the certificate authority 24 to each of the secure agents 20, 22 via the corresponding secure authenticated channel 56. The message 58 is preferably "pushed" by the certificate authority 24. By way of example, in an SVP system, the message 58 typically enters the SVP system via an acquisition point (a secure entry point in the SVP system, such as a smart card) and thereafter the message 58 enters the SVP devices and moves among the SVP devices using a secure authenticated channel based on a session key created for example using RSA encryption for public keys appearing in RSA signed certificates.

It will be appreciated by those ordinarily skilled in the art that the message 58 can be sent in the clear. Additionally, it will be appreciated by those ordinarily skilled in the art that the message 58 can be sent during set up of the secure authenticated channel 56 or in a pre-existing secure authenticated channel. It will be appreciated by those ordinarily skilled in the art that the message 58 can be embedded in any suitable clear or encrypted data stream for example, but not limited to: an encrypted content stream; a clean content stream; data including control information via a secure authenticate channel or via a non-trusted channel (for example, but not limited to, in a signed license of a control word or an entitlement control message).

Reference is now made to FIG. 6, which is a partly pictorial, partly block diagram view of the secure agents 20, 22 of the system 10 of FIG. 1 processing receipt of the enforcement generation index 54 of FIG. 5.

The message 58 including the enforcement generation index 54 received by each of the secure agents 20, 22 is preferably decrypted by the secure agents 20, 22, respectively.

The secure agents 20, 22 typically check the authenticity of the enforcement generation index 54 against the digital signature 60. The digital signature 60 is described in more detail with reference to FIG. 9.

The enforcement generation index 54 is generally stored as the LKEGI 42. Therefore, the old value of the LKEGI 42 of 1 is generally replaced by 2, which is the value of the enforcement generation index 54.

Figure 7:
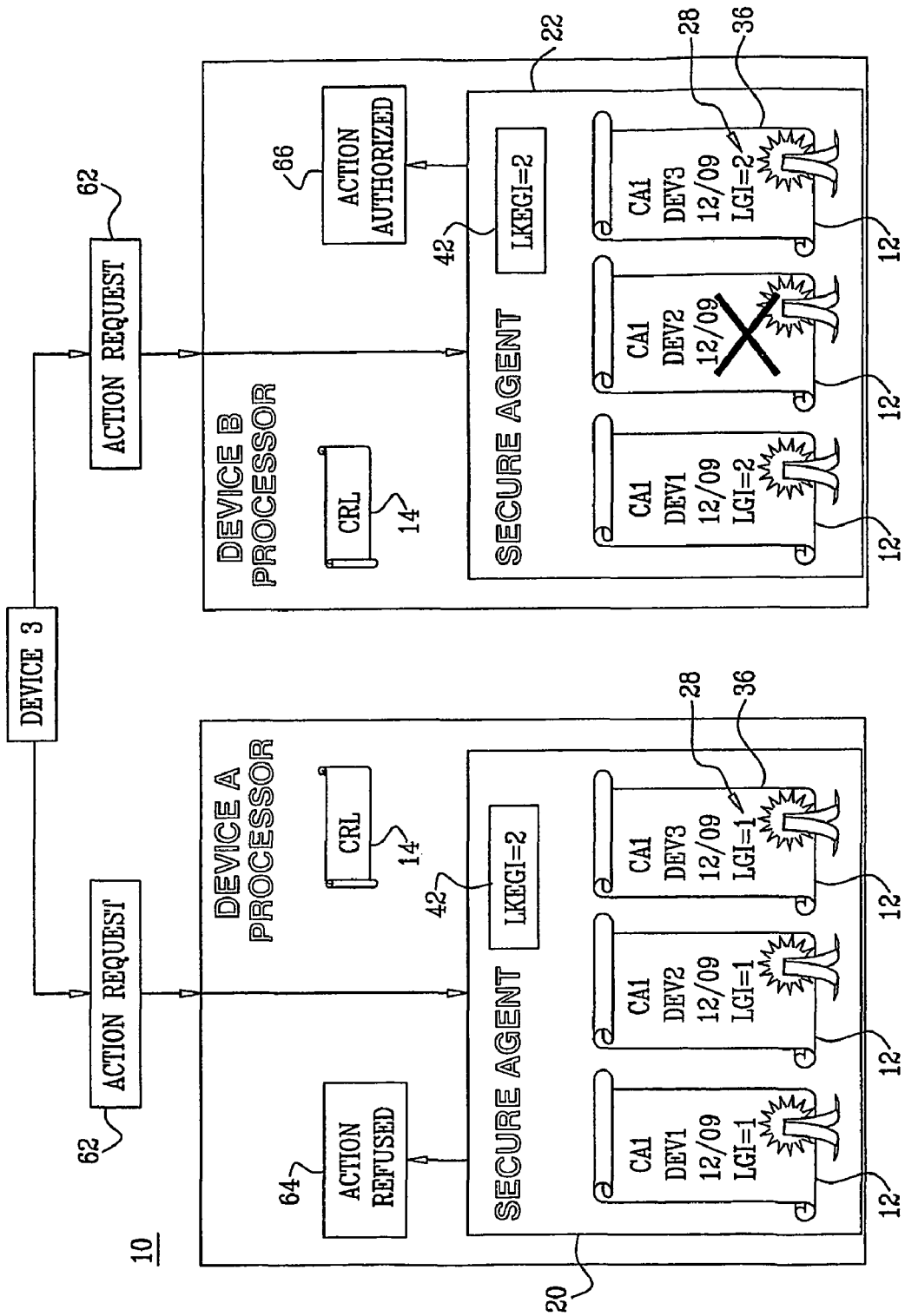
FIG. 7 is a partly pictorial, partly block diagram view of the secure agents of the system of FIG. 1 processing another action request from the device of FIG. 3.

Reference is now made to FIG. 7, which is a partly pictorial, partly block diagram view of the secure agents 20, 22 of the system 10 of FIG. 1 processing another action request 62 from the device 3.

After the LKEGI 42 has been updated by the enforcement generation index 54 (FIG. 6), use of the new certificate revocation list 14 is preferably automatically enforced by refusing performance of an action associated with one of the certificates 12 if the list generation index 28 of the associated certificate 12 is earlier in the series of generation indices than the LKEGI 42.

By way of example only, when the action request 62 sent by the device 3 is received by the secure agent 20, the secure agent 20 preferably checks that the certificate 36 has a valid expiry date (12/09) and that the list generation index 28 of the certificate 36 (associated with the device 3) is not earlier in the series of generation indices than the LKEGI 42. As the list generation index 28 of the certificate 36 (equal to 1) is earlier in the series of generation indices than the LKEGI 42 (equal to 2), the action request 62 is refused by the secure agent 20 (block 64).

Similarly, when the action request 62 of the device 3 is received by the secure agent 22, the secure agent 22 preferably checks that the certificate 36 has a valid expiry date (12/09) and that the list generation index 28 of the certificate 36 (associated with the device 3) is not earlier than the LKEGI 42. As the list generation index 28 of the certificate 36 (equal to 2) is not earlier in the series of generation indices than the LKEGI 42 (equal to 2), the action request 62 is authorized by the secure agent 22 (block 66).

It should be noted that the secure agents 20, 22, as appropriate, optionally revoke any certificates 12 having a list generation index 28 which is earlier in the series of generation indices than the LKEGI 42. The revocation is typically triggered by an action request from a device. However, in accordance with an alternative preferred embodiment of the present invention, the revocation is performed automatically at any appropriate time, for example, but not limited to, when the LKEGI 42 is updated.

It should be noted that one or more certain actions (for example, but not limited to, lower security actions) are generally allowed even if the list generation indices 28 of the certificates 12 associated with the certain actions are earlier in the series of the generation indices than the LKEGI 42. In other words, the certain actions are preferably not subject to certificate revocation list enforcement controls.

Figure 8:
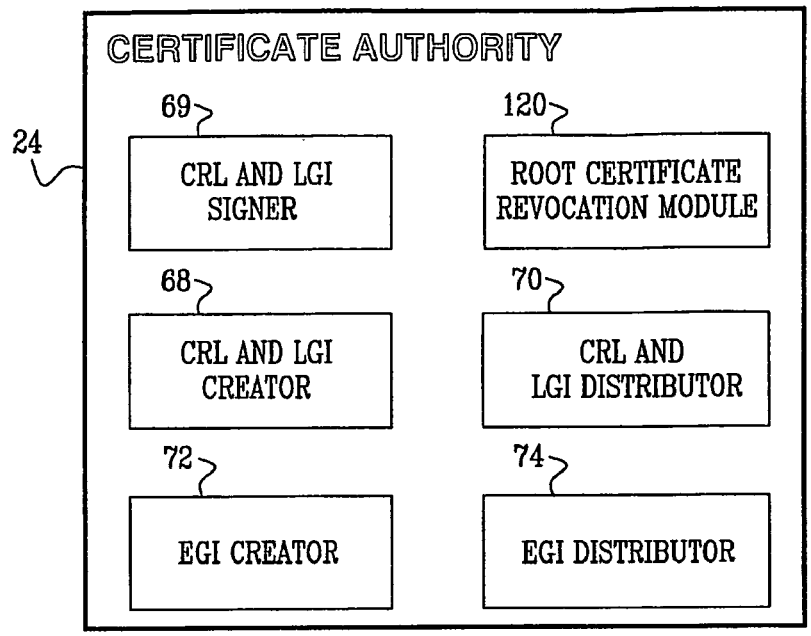
FIG. 8 is a block diagram view showing a plurality of modules of a certificate authority for use with the system of FIG. 1.

Reference is now made to FIG. 8, which is a block diagram view showing a plurality of modules of the certificate authority 24 of the system 10 of FIG. 1. Reference is also made to FIG. 1. The certificate authority 24 preferably includes a CRL and LGI creator 68, a CRL and LGI signer 69, a CRL and LGI distributor 70, an EGI creator 72 and an EGI distributor 74.

The CRL and LGI creator 68 is typically operative to create each of the certificate revocation lists 14 with the associated list generation index 28. The CRL and LGI signer 69 is typically operative to cryptographically sign the certificate revocation list 14 and the list generation index 28 with the signature 30. The CRL and LGI distributor 70 is typically operative to prepare each of the certificate revocation lists 14 and the associated list generation index 28 for delivery to the processors 16, 18 either by "pull" or "push" delivery as described with reference to FIG. 1 above.

Reference is also made to FIG. 5 in additional to FIG. 8. The EGI creator 72 is preferably operative to create the message 58 including the enforcement generation index 54 and the digital signature 60 of the enforcement generation index 54. The EGI distributor 74 is preferably operative to prepare the message 58 for delivery to the secure agents 20, 22 as described with reference to FIG. 5 above.

Figure 9:
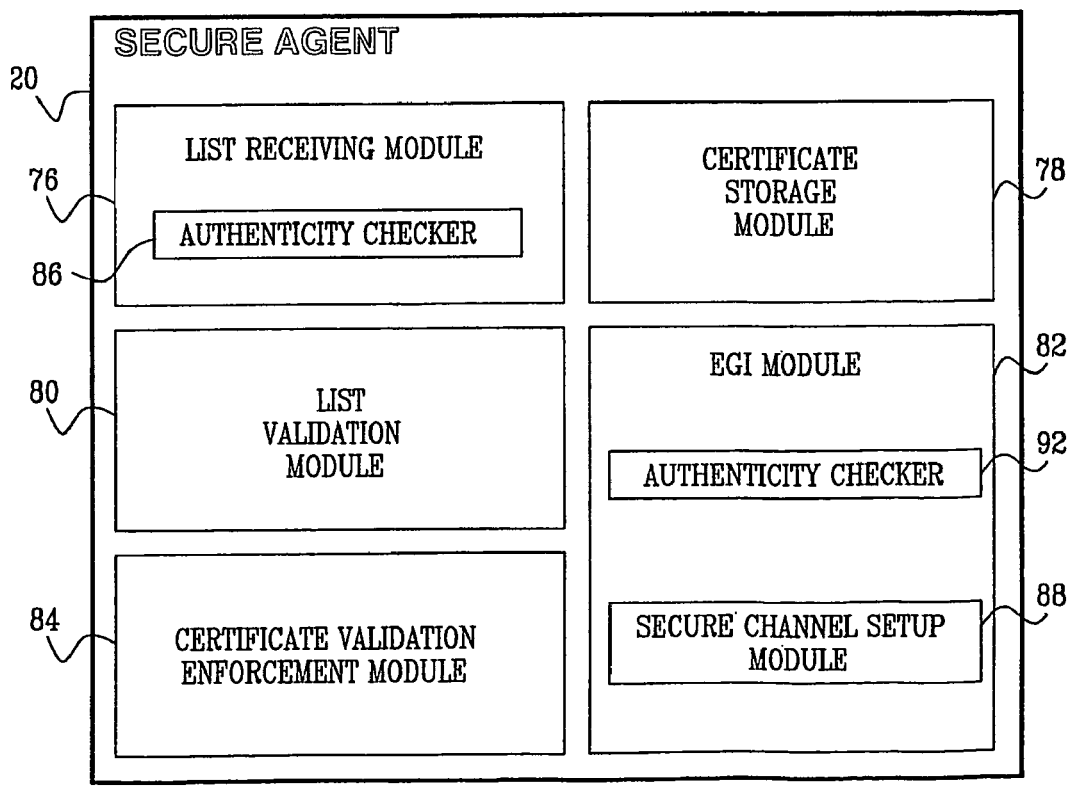
FIG. 9 is a block diagram view showing a plurality of modules of the secure agent of the system of FIG. 1.

Reference is now made to FIG. 9 is a block diagram view showing a plurality of modules of the secure agent 20 of the system 10 of FIG. 1. Reference is also made to FIG. 1.

The secure agent 20 preferably includes a list receiving module 76, a certificate storage module 78, a list validation module 80, an enforcement generation index module 82 and a certificate validation enforcement module 84.

The list receiving module 76 is typically operative, to receive the certificate revocation list 14 and an associated one of the list generation indices 28 as an identifier of the certificate revocation list 14.

The list receiving module 76 preferably includes an authenticity checker 86 to check the authenticity of the certificate revocation list 14 and the list generation index 28, typically by checking the signature 30.

The certificate storage module 78 is generally operative to store the certificates 12 therein. In accordance with an alternative preferred embodiment of the present invention, the certificates 12 are stored in an insecure external memory, and the integrity of the certificates 12 is preferably guaranteed by a MAC, for example, but not limited to, CBC MAC based on any block cipher such as 3DES or AES, or a digital signature such as RSA or DSA, by way of example only.

The list validation module 80 is preferably operative to check the certificates 12 stored in the certificate storage module 78 against the certificate revocation list 14. The list validation module 80 is also typically operative to associate each of the certificates 12, which have been checked against the certificate revocation list 14, with the list generation index 28. The certificate storage module 78 is generally operative to store the checked certificates 12 such that each of the checked certificates 12 includes the list generation index 28.

Reference is also made to FIGS. 5 and 6 in addition to FIG. 9.

The enforcement generation index module 82 preferably includes a secure channel setup module 88 and an authenticity checker 92.

The secure channel setup module 88 is typically operative to establish a secure authenticated channel, preferably in cooperation with the certificate authority 24, in order to receive the message 58 including the enforcement generation index 54 and the digital signature 60.

The enforcement generation index module 82 is generally operative to receive the enforcement generation index 54 associated with the latest certificate revocation list 14 in use.

The authenticity checker 92 is typically operative to check the authenticity of the enforcement generation index 54 by checking the digital signature 60.

The enforcement generation index module 82 is generally operative to store the enforcement generation index 58 as the LKEGI 42.

The certificate validation enforcement module 84 is preferably operative to refuse performance of an action associated with one of the certificates 12 if the list generation index 28 of the certificate 12 is earlier in the series of generation indices than the LKEGI 42.

The certificate validation enforcement module 84 is typically optionally operative to revoke one of the certificates 12 if the list generation index 28 of the certificate 12 is earlier in the series of the generation indices than the LKEGI 42. The revocation is typically triggered by an action request from a device. However, in accordance with an alternative preferred embodiment of the present invention, the revocation is performed automatically at any appropriate time, for example, but not limited to, when the LKEGI 42 is updated.

The certificate validation enforcement module 84 is preferably operative to allow performance of certain actions (for example, but not limited to, lower security actions) even if the list generation indices 28 of the certificates 12 associated with the certain actions are earlier in the series of the generation indices than the LKEGI 42. In other words, the certain actions are preferably not subject to certificate revocation list enforcement controls.

A potential problem with the system 10 is that a hacker could try to bring the system down by sending an enforcement generation index which has a value greater than the current list generation index 28 of the certificate revocation list 14 (FIG. 1) thereby causing all the certificates 12 held by the secure agents 20, 22 to be revoked or become effectively invalid. The potential problem is typically solved by digitally signing the enforcement generation index (EGI) 54 with the digital signature 60 so that the secure agents 20, 22 only use an authentic EGI. A preferred method of forming the digital signature 60 is described below.

A value I is defined as:

$$I = h^{(C+1)}(R) \qquad \text{(Equation 1)},$$

wherein h is a one-way function for example, but not limited to a cryptographic hash function such as SHA-1 or MD5. However, it will be appreciated by those ordinarily skilled in the art that any suitable one-way function can be used for the function h. The function h uses R as the first input. R is typically at least 80 bits long, and preferably 128 bits long. The function h is preferably repeated C+1 times using the output of the previous calculation of the function h as the input for the current calculation of the function h. C is a constant which is preferably larger than the number of new certificate revocation lists that the system 10 is estimated to produce during the lifetime of the system 10.

The function h and the value I are typically known publicly. R is secret, preferably known only to the certificate authority 24.

The signature for the value of EGI=0 is given by:

$$S_0 = h^C(R) \qquad \text{(Equation 2)},$$

where the function h is repeated C times with R as the initial input to the function h.

The values of the EGI and $S_0$ are preferably sent in the message 58.

The EGI=0 value is checked against the signature S by performing the following:

$$h(S) \qquad \text{(Equation 3)},$$

where the function h uses S as the input.

If the output of equation 3 is equal to I, then the signature, S, is correctly authenticating the EGI.

In general, for an EGI having a value x, the signature $S_{(x)}$ is given by:

$$S_{(x)} = h^{(C-x)}(R) \qquad \text{(Equation 4)},$$

where the function h is repeated C−x times with R as the initial input to the function h.

In general, to check a signature $S_{(x)}$, the following function is performed:

$$h^{(x+1)}(S) \qquad \text{(Equation 5)},$$

where the function h is repeated x+1 times using S as the first input of the function h.

If the output of equation 5 is equal to I, then the signature is correctly authenticating the EGI.

It will be appreciated by those ordinarily skilled in the art that any suitable digital signing system can be used to digitally sign the enforcement generation indices, for example, but not limited to, the RSA or DSA signature algorithm.

Figure 10:
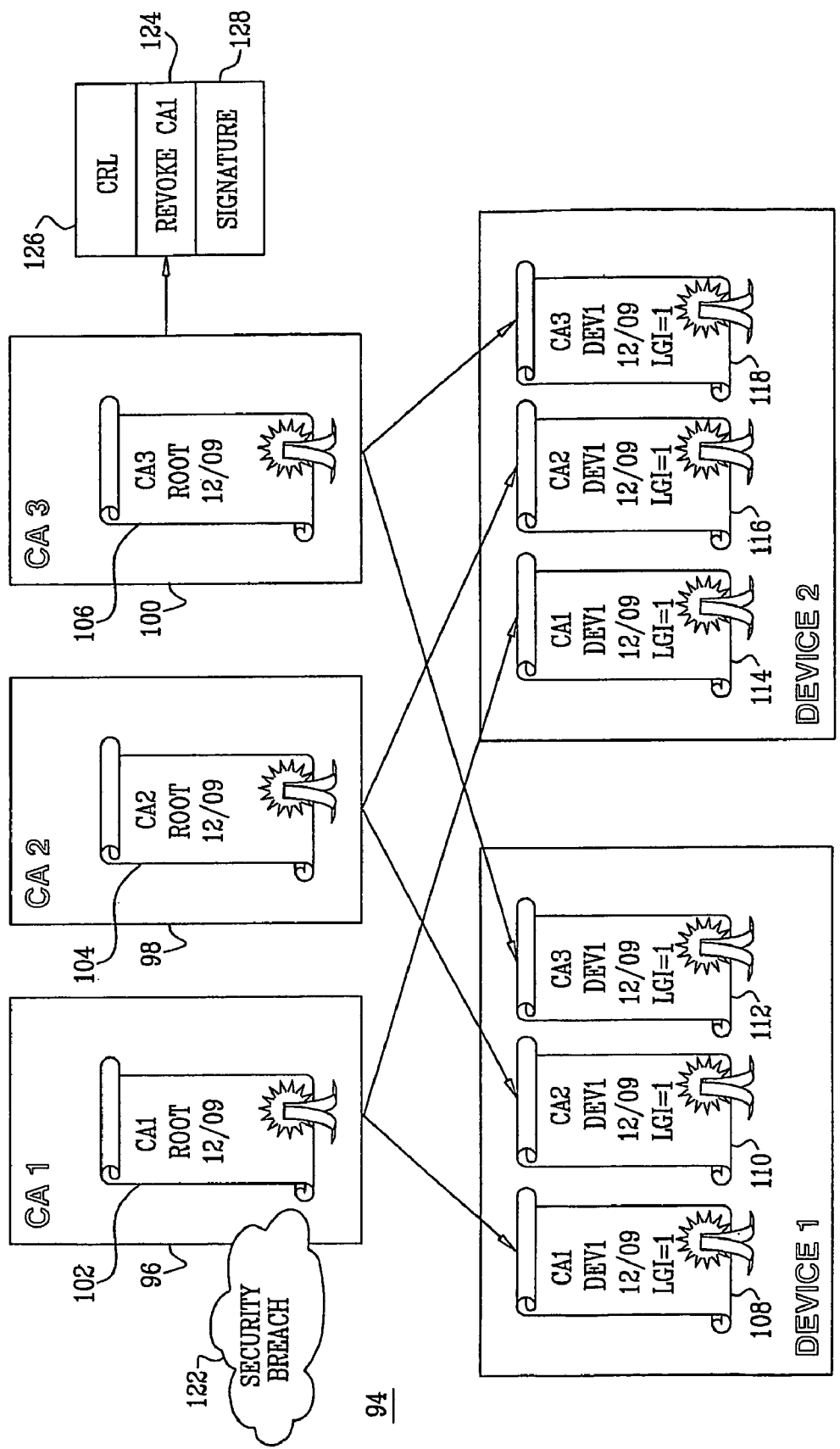
FIG. 10 is a partly pictorial, partly block diagram view of a multiple root certificate authority system constructed and operative in accordance with another preferred embodiment of the preferred invention.

Reference is now made to FIG. 10, which is a partly pictorial, partly block diagram view of a multiple root certificate authority system 94 constructed and operative in accordance with another preferred embodiment of the preferred invention. The multiple root certificate authority system 94 preferably includes a plurality of root certificate authorities 96, 98, 100. The root certificate authority (CA1) 96 typically has an associated root certificate 102. The root certificate authority (CA2) 98 typically has an associated root certificate 104. The root certificate authority (CA3) 100 typically has an associated root certificate 106. It will be appreciated by those ordinarily skilled in the art that the system 94 is not restricted to three root certificate authorities and that two or more certificate authorities may be used. The root certificates 102, 104, 106 of the root certificate authorities 96, 98, 100 are typically issued and signed by the root certificate authority associated with the certificate. However, it will be appreciated by those ordinarily skilled in the art that the root certificates may be signed by an entity other than the root certificate authority associated with the certificate. In an SVP system, by way of example only, the certificates 102, 104, 106 are optionally hardwired, instead of being signed.

Each of the root certificate authorities 96, 98, 100 issues a certificate to the device 1 and the device 2. It will be appreciated by those ordinarily skilled in the art that certificates may be issued to any suitable number of devices or entities. Therefore, device 1 has a certificate 108 issued by the root certificate authority 96, a certificate 110 issued by the root certificate authority 98 and a certificate 112 issued by the root certificate authority 100. Similarly, the device 2 has a certificate 114 issued by the root certificate authority 96, a certificate 116 issued by the root certificate authority 98 and a certificate 118 issued by the root certificate authority 100. It should also be noted that there may also be intermediate levels in the certification chains.

Apart from the issuer, the certificate 108, the certificate 110 and the certificate 112 are preferably substantially the same. Similarly, apart from the issuer, the certificate 114, the certificate 116 and the certificate 118 are preferably substantially the same.

In an SVP system having substantially identical certificates issued to the same entity by different certificate authorities is generally particularly advantageous. For example, in an SVP system, the root certificates may be "built" into the hardware (hardwired) of the SVP system and it is difficult to replace the root certificates "built" (hardwired) into the hardware. Therefore, relying on one certificate chain and one root certificate authority may be problematic, for example, if the root certificate authority relied upon is compromised.

However, in a system including multiple root certificate authorities and multiple certificate chains per device/entity, if one of the certificate authorities becomes compromised the certificate chains of the uncompromised root certificate authorities can typically still be used thereby providing a "fall-back" position.

Additionally, the devices or entities in the system 94 preferably need to be informed that the compromised root certificate authority has been compromised so that certificate chains associated with the compromised root certificate authority are not validated as valid certificate chains.

Therefore, the multiple root certificate authority system 94 is preferably operative to issue revocation data for revoking the root certificate(s) 102, 104, 106 of one or more of the root certificate authorities 96, 98, 100, if necessary.

In the example of FIG. 10, the root certificate authority 96 is compromised by a security breach 122. The root certificate authority 100 issues a certificate revocation list 126 including revocation data 124 in order to revoke the root certificate 102. The certificate revocation list 126 and the revocation data 124 is typically cryptographically signed with a signature 128, for example, but not limited to, using the RSA or DSA signature algorithm.

The multiple root certificate authority system 94 preferably includes functionality for revoking the root certificates using the two stage non-enforcement and enforcement method described with reference to the system 10 of FIGS. 1-9. Therefore, each of the root certificate authorities 96, 98, 100 can be implemented based on elements of the certificate authority 24 of FIG. 8 with the following additional features.

Reference is again made to FIG. 8. The certificate authority 24 also preferably includes a root certificate revocation module 120 typically operative to issue the certificate revocation list 126 including the revocation data 124. The CRL and LGI signer 69 is typically configured to cryptographically sign the certificate revocation list 126 including the revocation data 124.

In accordance with another alternative preferred embodiment of the present invention, the revocation data 124 is cryptographically signed by at least two of the root certificate authorities 96, 98, 100. Preferably, a root certificate authority cannot revoke its own root certificate.

Figure 11:
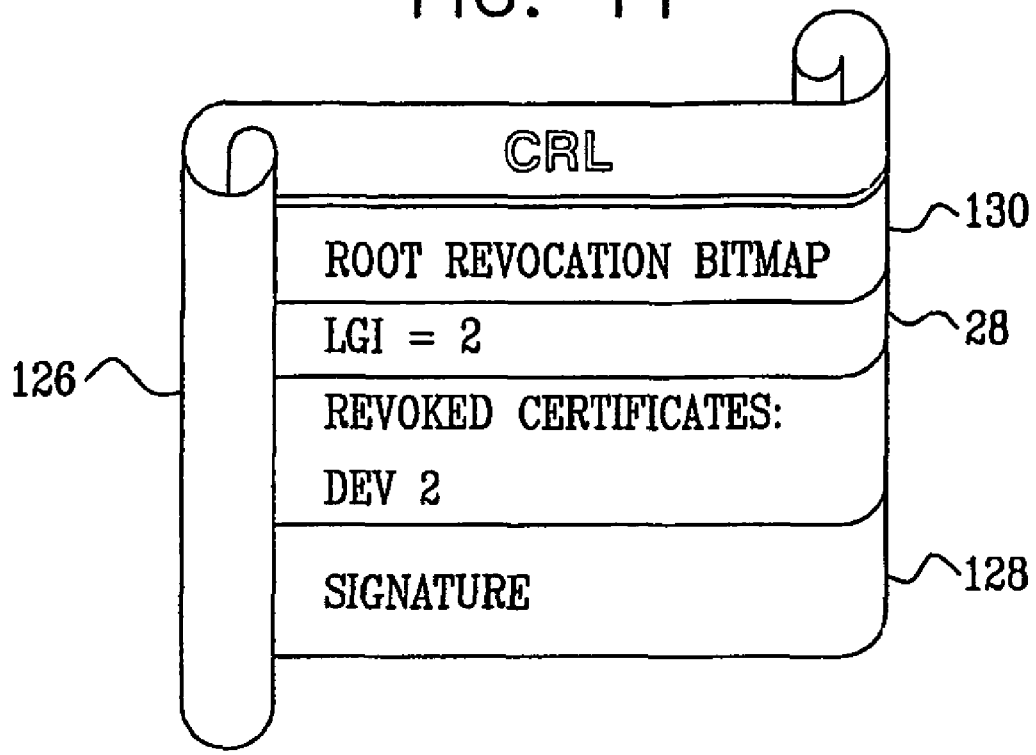
FIG. 11 is a pictorial view of a certificate revocation list produced by the system of FIG. 10.

Reference is now made to FIG. 11, which is a pictorial view of a more detailed view of the certificate revocation list 126 produced by the system 94 of FIG. 10. The certificate revocation list 126 preferably includes a root revocation bitmap 130 which includes the revocation data 124 of FIG. 10. The certificate revocation list 126 also preferably includes the list generation index 28 and the signature 128. The root revocation bitmap 130 typically includes one bit for each of the root certificate authorities 96, 98, 100 in the multiple root certificate authority system 94. Each bit of the root revocation bitmap 130 conveys the status of one of the root certificate authorities 96, 98, 100 for example, a "zero" denotes that the root certificate authority associated with the bit has valid certificate and a "one" denotes that the root certificate authority associated with the bit has a revoked certificate, or vice versa. So for example, if there are 3 root certificate authorities in the system, the root revocation bitmap 130 has 7 possible values (for example: 000, 001, 010, 011, 110, 101 and 100) (the value 111, that typically means that all root certificates are revoked, is preferably not used because no root certificate authority is available to sign such a revocation) and if there are 4 root certificate authorities in the system, the root revocation bitmap 130 has 15 possible values.

Figure 12:
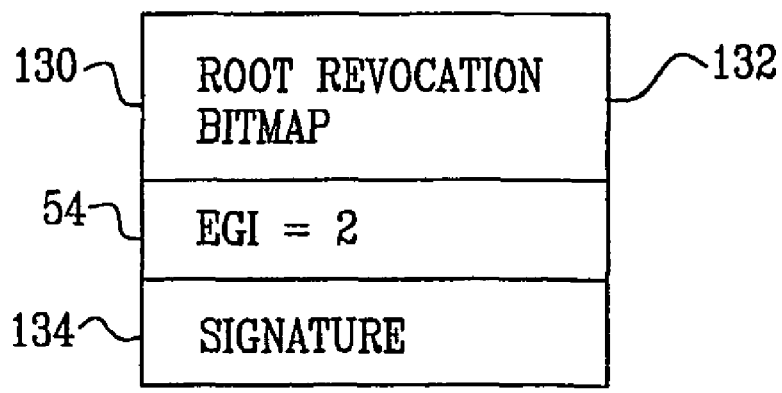
FIG. 12 is a pictorial view of an enforcement message produced by the system of FIG. 10.

Reference is now made to FIG. 12, which is a pictorial view of an enforcement message 132 produced by the system 94 of FIG. 10. Reference is also made to FIG. 8. The EGI creator 72 is preferably operative to create the enforcement message 132 including: the enforcement generation index 54; the root revocation bitmap 130; and a digital signature 134 of the enforcement generation index 54 and the root revocation bitmap 130.

A potential problem with the system 94 is that a hacker could try to bring the system 94 down by sending a root revocation bitmap as part of a certificate revocation list and/or an enforcement message thereby incorrectly revoking one or more of the root certificates. The potential problem is typically solved by digitally signing the certificate revocation list 126 (FIG. 11) and the enforcement message 132 (FIG. 12). The certificate revocation list 126 is typically signed with the signature 128 (FIG. 11), for example, but not limited to, using the RSA or DSA signature algorithm. The enforcement message 132 (FIG. 12) is typically signed with the digital signature 134. A most preferred method of forming the digital signature 134 is described below.

For each possible value of the root revocation bitmap 130, a value I is defined as:

$$I=h^{(C+1)}(R) \qquad \text{(Equation 6)},$$

wherein h is a one-way function for example, but not limited to a cryptographic hash function such as SHA-1 or MD5. However, it will be appreciated by those ordinarily skilled in the art that any suitable one-way function can be used for the function h. The function h uses R as input. R is a secret value, preferably only known to the certificate authorities needing to use R for signing the digital signature 134. R is typically at least 80 bits long, and preferably 128 bits long. The function h is preferably repeated C+1 times using the output of the previous calculation of the function h as the input for the current calculation of the function h. C is a constant for example, but not limited to $2^{12}$.

There is preferably a different value of R for each possible value of the root revocation bitmap 130. The index of each possible value of the root revocation bitmap 130 is defined as t. Therefore, for example, when the multiple root certificate authority system 94 includes 4 root certificate authorities, there are 15 possible value of the root revocation bitmap 130 and therefore there are 15 values of t and 15 corresponding values of R generally denoted $R_t$ for example, $R_1, R_2 \ldots R_{15}$.

Therefore, for the root revocation bitmap 130 with index t, the value $I_t$ is defined as:

$$I_t = h^{(C+1)}(R_t) \quad \text{(Equation 7)}$$

The value $I_t$ for each of the values t and the function h are typically known publicly.

For EGI=j and root revocation bitmap index=t, the signature S (the digital signature 134) is given by:

$$S = h^{(C-j)}(R_t) \quad \text{(Equation 8)},$$

where the function h is repeated (C−j) times with $R_t$ as the initial input to the function h.

The values of the EGI, the root revocation bitmap and S are preferably sent in the enforcement message 132.

The values of the EGI and the root revocation bitmap are checked against the signature S by performing the following:

$$h^{(j+1)}(S) \quad \text{(Equation 9)},$$

where the function h uses S as the input.

If the output of equation 9 is equal to $I_t$, then the signature, S, is correctly authenticating the root revocation bitmap with index t and the EGI.

It will be appreciated by those ordinarily skilled in the art that any suitable digital signing system can be used to digitally sign the enforcement generation index 54 and the root revocation bitmap 130, for example, but not limited to, the RSA or DSA signature algorithm. It is appreciated that software components of the present invention may, if desired, be implemented in ROM (read only memory) form. The software components may, generally, be implemented in hardware, if desired, using conventional techniques.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

What is claimed is:

1. A method for enforcing use of certificate revocation lists in validating certificates, the certificate revocation lists being associated with a series of list generation indices such that each of the certificate revocations lists is assigned one of the list generation indices, the list generation indices advancing according to a time of generation of the certificate revocation lists, the certificate revocation lists and the list generation indices being cryptographically signed, the method comprising:
receiving one of the certificate revocation lists and an associated one of the list generation indices as an identifier of the one certificate revocation list;
checking the certificates against the one certificate revocation list;
associating each of the certificates, which have been checked against the one certificate revocation list, with the one list generation index;
receiving an enforcement generation index associated with a latest one of the certificate revocation lists in use;
storing the enforcement generation index as a last known enforcement generation index; and
refusing performance of an action associated with one of the certificates if the one list generation index of the one certificate is earlier in the series than the last known enforcement generation index.

2. The method according to claim 1, further comprising storing the checked certificates such that each of the checked certificates includes the one list generation index.

3. The method according to claim 1, further comprising checking an authenticity of the one certificate revocation list and the one list generation index.

4. The method according to claim 1, further comprising checking an authenticity of the enforcement generation index.

5. The method according to claim 1, further comprising establishing a secure authenticated channel to receive the enforcement generation index.

6. The method according to claim 1, further comprising revoking the one certificate if the one list generation index of the one certificate is earlier in the series than the last known enforcement generation index.

7. The method according to claim 1, further comprising allowing performance of another action even if the one list generation index of the one certificate is earlier in the series than the last known enforcement generation index.

8. A system for enforcing use of certificate revocation lists in validating certificates, the certificate revocation lists being associated with a series of list generation indices such that each of the certificate revocations lists is assigned one of the list generation indices, the list generation indices advancing according to a time of generation of the certificate revocation lists, the certificate revocation lists and the list generation indices being cryptographically signed, the system comprising:
physical computing machinery comprising:
a list receiving module to receive one of the certificate revocation lists and an associated one of the list generation indices as an identifier of the one certificate revocation list;
a list validation module to:
check the certificates against the one certificate revocation list; and
associate each of the certificates, which have been checked against the one certificate revocation list, with the one list generation index;
an enforcement generation index module to:
receive an enforcement generation index associated with a latest one of the certificate revocation lists in use; and
store the enforcement generation index as a last known enforcement generation index; and
a certificate validation enforcement module to refuse performance of an action associated with one of the certificates if the one list generation index of the one certificate is earlier in the series than the last known enforcement generation index.

9. The system according to claim 8, wherein the physical computing machinery further comprises a certificate storage module to store the checked certificates such that each of the checked certificates includes the one list generation index.

10. The system according to claim 8, wherein the list receiving module includes an authenticity checker to check an authenticity of the one certificate revocation list and the one list generation index.

11. The system according to claim 8, wherein the enforcement generation index module includes an authenticity checker to check an authenticity of the enforcement generation index.

12. The system according to claim 8, wherein the enforcement generation index module includes a secure channel setup module to at least partially establish a secure authenticated channel to receive the enforcement generation index.

13. The system according to claim 8, wherein the certificate validation enforcement module is operative to revoke the one certificate if the one list generation index of the one certificate is earlier in the series than the last known enforcement generation index.

14. The system according to claim 8, wherein the certificate validation module is operative to allow performance of another action even if the one list generation index of the one certificate is earlier in the series than the last known enforcement generation index.

15. A system for enforcing use of certificate revocation lists in validating certificates, the system comprising:
physical computing machinery comprising:
a list receiving module to receive a certificate revocation list and an associated list generation index as an identifier of the certificate revocation list, the certificate revocation list and the list generation index being cryptographically signed;
a list validation module to:
check the certificates against the certificate revocation list; and
associate each of the certificates, which have been checked against the certificate revocation list, with the list generation index;
an enforcement generation index module to:
receive an enforcement generation index associated with a latest certificate revocation list in use; and
store the enforcement generation index as a last known enforcement generation index; and
a certificate validation enforcement module to refuse performance of an action associated with one of the certificates if the list generation index of the one certificate is earlier a series generation indices than the last known enforcement generation index.

16. A system for enforcing use of certificate revocation lists in validating certificates, the system comprising:
physical computing machinery comprising:
means for receiving a certificate revocation list and an associated list generation index as an identifier of the certificate revocation list, the certificate revocation list and the list generation index being cryptographically signed;
means for checking the certificates against the certificate revocation list;
means for associating each of the certificates, which have been checked against the certificate revocation list, with the list generation index;
means for receiving an enforcement generation index associated with a latest certificate revocation list in use;
means for storing the enforcement generation index as a last known enforcement generation index; and
means for refusing performance of an action associated with one of the certificates if the list generation index of the one certificate is earlier a series generation indices than the last known enforcement generation index.

* * * * *